J. FANNING.
Lemon-Squeezer.
No. 226,166.    Patented April 6, 1880.
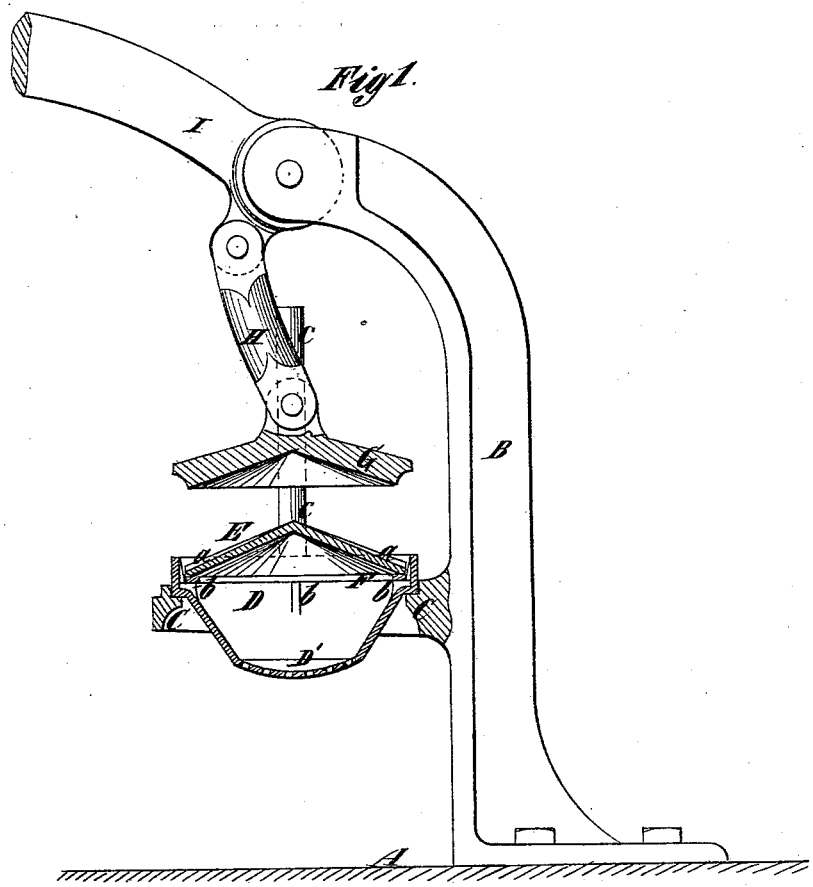
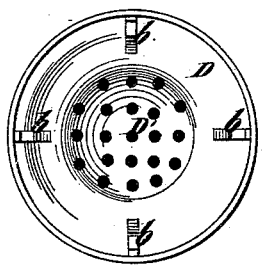
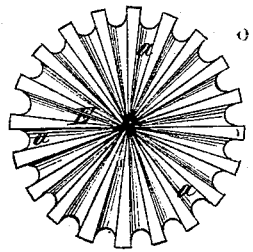
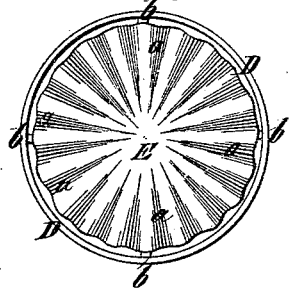

United States Patent Office.

JOHN FANNING, OF BROOKLYN, NEW YORK, ASSIGNOR TO FLORENCE L. BURCHARD, JESSIE L. FANNING, AND ELIDA H. PURDY, OF SAME PLACE.

LEMON-SQUEEZER.

SPECIFICATION forming part of Letters Patent No. 226,166, dated April 6, 1880.

Application filed January 27, 1880.

*To all whom it may concern:*

Be it known that I, JOHN FANNING, of Brooklyn, in Kings county, and State of New York, have invented certain new and useful Improvements in Lemon-Squeezers, of which the following is a specification.

My invention consists in the combination, in a lemon-squeezer, of a concentrator, a conical imperforate bed provided externally with gutters or grooves leading to its outer circumference, fitting within said concentrator and leaving spaces between the edge of said bed and said concentrator for the passage of juice, and an internally-conical presser, whereby juice expressed from lemons squeezed between the bed and presser will be conducted off to a receptacle, differences in the thickness of the lemon-rinds is compensated for, and a bed which can be more easily cleaned than a perforated bed is produced.

In connection with the bed, presser, and concentrator described, a strainer may be employed with advantage, though it is not necessarily used.

In the accompanying drawings, Figure 1 is a partly sectional side view of a lemon-squeezer embodying my improvements. Fig. 2 is a plan of a concentrator forming part of the same. Fig. 3 is a plan of the imperforate bed and concentrator, and Fig. 4 is a plan of a modified form of bed.

Similar letters of reference designate corresponding parts in all the figures.

A designates a base piece of wood or other suitable material, and B a cast-iron or other metallic standard erected thereon.

C designates a ring extending from the standard and receiving within it a concentrator, D, shown as having a perforated bottom, D', constituting a strainer, which, however, is by no means essential to my invention.

E designates a bed, upon which half-lemons are placed with the cut side downward. It is of conical form, provided with radial gutters or grooves *a*, and supported on shoulders or brackets *b* in the concentrator D in such position that the juice expressed from the lemons will run down from its gutters or grooves *a* into the concentrator D, and thence to the strainer D', under which a glass or other vessel may be arranged to catch the juice.

Sufficient space must be left between the bed E and the rim of the concentrator to provide for the free passage of the juice, and this is accomplished in this instance by scalloping the edge of the bed, as shown clearly in Fig. 3.

Both or either the concentrator and bed may be removed at pleasure.

A washer, F, of iron or other appropriate material, may be arranged under the bed E in case the rind of lemons to be squeezed be unusually thin.

The bed shown in Fig. 4 is similar to that above described, save that it is notched at its periphery to permit the passage of juice from its gutters, and may rest directly in the concentrator without intervention of the supporting steps or brackets *b*.

G designates a presser, made internally conical to correspond with the contour of the bed. It is susceptible of movement along guides *c* toward and from the bed D.

H designates a link or rod connecting the presser with one arm of an elbow-lever, I, pivoted to the upper end of the standard B, and serving as the means for operating the presser.

It will be seen that by my invention I produce a very simple, cheap, and effective lemon-squeezer, wherein is a bed that may be very easily kept clean, and one, moreover, that, owing to its gutters or grooves, will, in a great measure, compensate for varying thickness in the rinds of lemons to be squeezed.

What I claim as my invention, and desire to secure by Letters Patent, is—

1. The combination, in a lemon-squeezer, of a concentrator, a conical imperforate bed provided externally with gutters or grooves leading to its outer circumference, fitting within said concentrator and leaving a space between the edge of the bed and the concentrator for the passage of juice, and an internally-conical presser, substantially as and for the purpose specified.

2. The combination, in a lemon-squeezer, of a concentrator, a conical imperforate bed provided externally with gutters or grooves leading to its outer circumference, fitting within said concentrator and having its edge scalloped, and an internally-conical presser, substantially as and for the purpose specified.

3. The combination, in a lemon-squeezer, of the conical imperforate bed E, concentrator D, strainer D', presser G, link or rod H, and lever I, substantially as and for the purpose specified.

JOHN FANNING.

Witnesses:
H. A. CARTER,
CHAS. L. BURCHARD.